United States Patent

Senoo

[11] 4,377,293
[45] Mar. 22, 1983

[54] LEVEL REGULATOR FOR AN AUTOMOTIVE VEHICLE

[75] Inventor: Tetsuo Senoo, Inagi, Japan

[73] Assignee: Nissan Motor Company, Limited, Kanagawa, Japan

[21] Appl. No.: 223,842

[22] Filed: Jan. 9, 1981

[30] Foreign Application Priority Data

Jan. 16, 1980 [JP] Japan ............................. 55-3388

[51] Int. Cl.³ ................................................ B60S 9/00
[52] U.S. Cl. ................................ 280/6 R; 267/64.28; 280/707; 310/DIG. 3
[58] Field of Search ........................... 280/6 R, 6.1, 6.11, 280/707; 267/64.28; 310/DIG. 3

[56] References Cited

U.S. PATENT DOCUMENTS

| | | | |
|---|---|---|---|
| 2,788,491 | 4/1957 | Millar | 310/DIG. 3 |
| 3,269,685 | 8/1966 | Wallace | 280/6.1 |
| 3,873,123 | 3/1975 | Joneleit | 280/707 |
| 4,017,099 | 4/1977 | Hegel | 280/707 |
| 4,164,664 | 8/1979 | Kasiewicz | 280/707 |
| 4,185,845 | 1/1980 | Misch | 280/707 |
| 4,266,790 | 5/1981 | Uemura | 280/6.1 |
| 4,323,266 | 4/1982 | Savage | 280/707 |

FOREIGN PATENT DOCUMENTS 2017351 10/1979 United Kingdom .

Primary Examiner—Joseph F. Peters, Jr.
Assistant Examiner—John A. Carroll
Attorney, Agent, or Firm—Schwartz, Jeffery, Schwaab, Mack, Blumenthal & Koch

[57] ABSTRACT

A level regulator for an automotive vehicle such that a power voltage is applied to the amplifiers only for a fixed period after a level signal has been detected or only while a level signal is being detected within a fixed period, so that a wasteful current can be prevented from being passed therethrough when the vehicle is left parked with one of the wheels on the sidewalk or uneven ground, and the battery can be protected against excessive discharge. The level regulator of the present invention comprises a power supply controller including a differential circuit, a switching transistor and a timer of a monostable multivibrator.

4 Claims, 3 Drawing Figures

LEVEL REGULATOR FOR AN AUTOMOTIVE VEHICLE

BACKGROUND OF THE INVENTION

1. Field of the Invention

The present invention relates generally to a level regulator for an automotive vehicle, and more particularly to a power controller used with the level regulator such that the power is kept supplied to the amplifier only during a fixed period after a level signal has been output from the level sensor.

2. Description of the Prior Art

As is well known, there exists a level regulator for an automotive vehicle, which can automatically regulate or correct the level of the vehicle. This level regulator is operated when the level of the vehicle is too low because passengers or freight have been loaded into the vehicle or too high because they have been unloaded therefrom.

In the prior-art level regulator, however, since the supply voltage is always applied to the regulator directly from the battery regardless of the on/off position of the ignition switch, a dark current is always flowing even when no level regulation is being performed and therefore the battery can easily be discharged excessively.

In addition, when the level sensor keeps a level signal outputting for some reason such as when the vehicle is left parked at a slope, the solenoid valve is kept operating and a large current continues to flow, so that the battery is discharged in a short period of time. A more detailed description of the prior-art level regulator will be made hereinafter with reference to FIG. 1.

SUMMARY OF THE INVENTION

With these problems in mind therefore, it is the primary object of the present invention to provide a level regulator for an automotive vehicle which can prevent current from being passed excessively thereto from the battery. To achieve the above-mentioned object, the level regulator of the present invention comprises a power controller which supplies a voltage to the amplifiers for energizing the level regulating means (a compression solenoid valve, an exhaust solenoid valve, and a shock absorber) only during a fixed period after a level sensor has outputted a level signal. Therefore, even if the level signal keeps outputting, such as when the vehicle is left parked with one wheel placed on a sidewalk, since the supply voltage is cut off automatically after a fixed period has elapsed, the battery is prevented from being discharged excessively.

BRIEF DESCRIPTION OF THE DRAWINGS

The features and advantages of a level regulator according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
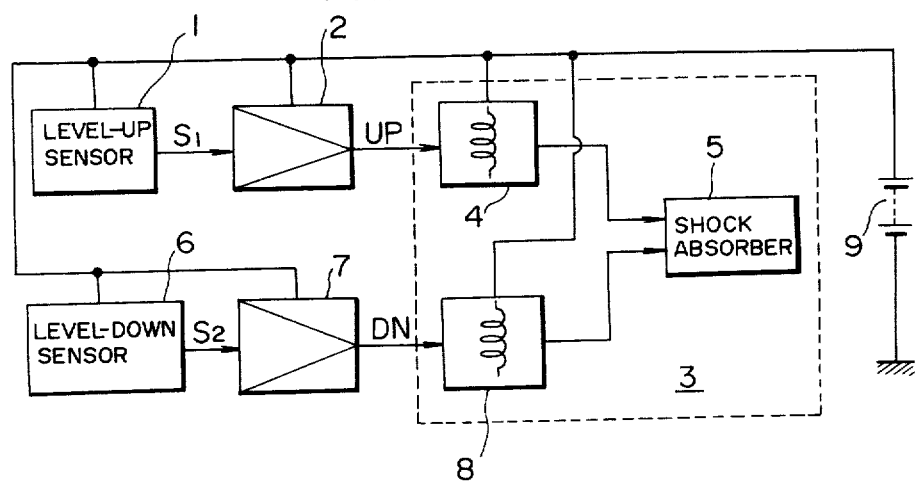
FIG. 1 is a schematic wiring block diagram of a prior-art level regulator for an automotive vehicle.

To facilitate understanding of the present invention, a brief reference will be made to a prior-art level regulator for an automotive vehicle. Referring to FIG. 1, a level-up signal $S_1$ is outputted from a level-up sensor 1 when the level of the vehicle is too low because passengers or freight have been loaded into the vehicle. This signal $S_1$ is amplified through a level-up amplifier 2 to generate an UP-signal. This UP-signal energizes a compression solenoid valve 4 to inject a gas into a shock absorber 5 for increasing the level of the car. When the level has been regulated to a predetermined value, the level-up signal $S_1$ is no longer outputted from the level-up sensor 1, and the compression solenoid valve 4 is closed to maintain the correct level.

On the other hand, a level-down signal $S_2$ is outputted from a level-down sensor 6 when the level of the vehicle is too high because passengers or freight have been unloaded from the vehicle. This signal $S_2$ is amplified through a level-down amplifier 7 to generate a DN-signal. This DN-signal energizes an exhaust solenoid valve 8 for decreasing the level of the car. When the level has been regulated to a predetermined value, the level-down signal $S_2$ is no longer outputted from the level-down sensor 6, and the exhaust solenoid valve 8 is closed to maintain the level. In this embodiment, the compression solenoid valve 4, the exhaust solenoid valve 8, and the shock absorber 5 together are termed the level regulating means 3.

In the prior-art level regulator described above with reference to FIG. 1, since a supply voltage is always applied to the level regulator directly from the battery 9, regardless of the on/off position of the ignition switch, the level of the vehicle is adjustable whenever the horizontal position of the vehicle changes for any reason.

However, since the supply voltage is always applied to the amplifiers 2 and 7 even when no level regulation is being made, dark currents are flowing through the electronic devices (e.g. transistors) of the amplifiers. This has often caused the battery 9 to be discharged, and there has been a problem in that it could be difficult to start the engine.

In addition, when the vehicle is left parked with one wheel on a sidewalk or parked on uneven ground or for some reason when either of the level signals $S_1$ and $S_2$ is maintained from either of the level sensors 1 and 6, the amplifiers 2 and 7 and the solenoid valves 4 and 8 are all kept operating, and a relatively great current continues to flow, thus discharging the battery 9 in a short period of time.

Figure 2:
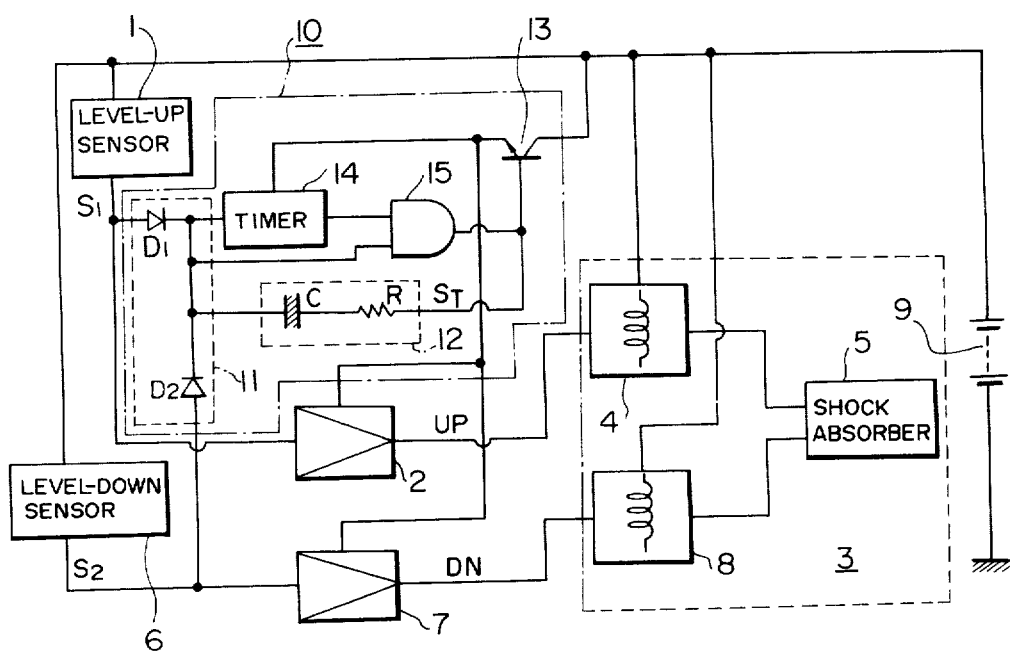
FIG. 2 is a schematic wiring block diagram of a first embodiment of the level regulator of the present invention.
Figure 3:
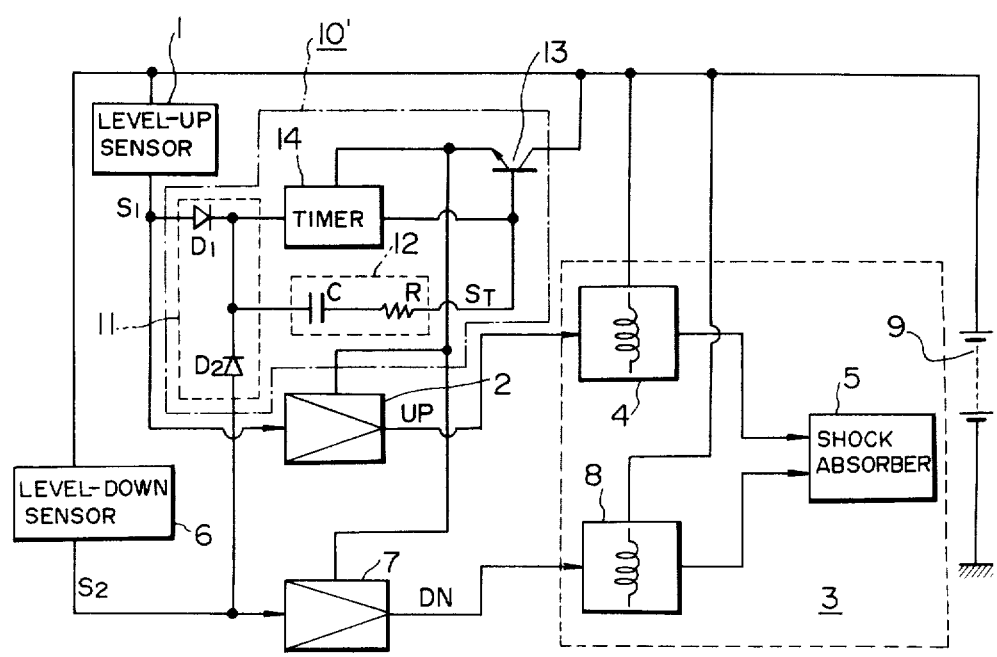
FIG. 3 is a schematic wiring block diagram of a second embodiment of the level regulator of the present invention.

In view of the above description, reference is now made to FIGS. 2 and 3, and more specifically to FIG. 2, wherein a first embodiment of the level regulator of the present invention is illustrated.

In FIG. 2, the reference numeral 10 denotes a power supply controller, which supplies the voltage to the amplifiers 2 and 7 only while either of $S_1$ and $S_2$ is being inputted thereto within a fixed period after either of level signals $S_1$ and $S_2$ from the level sensors 1 and 6 has been inputted thereto.

The power supply controller 10 comprises an OR circuit 11 including two diodes $D_1$ and $D_2$ which provide an OR-operation on the level signals $S_1$ and $S_2$ from the level sensors 1 and 6, a differential circuit 12 including a condenser C and a resistor R to differentiate the output from the OR circuit 11 for obtaining a trigger signal $S_T$ having a higher voltage potential of a differential waveform for a fixed period, a switching means such as a transister 13 turned on in response to the trigger signal $S_T$ to supply a voltage from the battery 9 to the amplifiers 2 and 7 and a timer 14, (such as a monostable multivibrator the output potential of which is kept high only during a fixed period of time after either of the level signals $S_1$ and $S_2$ has triggered it through the OR circuit 11,) and an AND circuit 15 to provide an AND-operation for the output of the OR circuit 11 and the timer 14 in order to keep the transistor 13 turned on.

In this embodiment, the level sensors 1 and 6 use an on-off type photoelectric switch including a light-emitting diode and a phototransistor, or an electromagnetic switch including a Hall effect device and a permanent magnet, being arranged so as to be turned on only when the level of the vehicle becomes higher or lower than a predetermined level.

Next, a detailed description will be made of the operation of the embodiment shown in FIG. 2. When the vehicle level is normal, neither of the level sensors 1 and 6 output their level signals $S_1$ and $S_2$, the transistor 13 of the power supply controller 10 is kept off and no voltage is applied to the amplifiers 2 and 7, thus allowing saving of power consumption caused by dark currents. Although a small current is always flowing through the level sensors 1 and 6 to operate them, it is possible to minimize the amount of the dark current when designing the circuit, and the battery 9 can be prevented from discharging excessively.

If the level of the vehicle becomes lower because passengers or freight are loaded thereinto, the level sensor 1 detects the level and outputs the level signal $S_1$. The signal $S_1$ is inputted to the timer 14, one input terminal of the AND circuit 15, and the differential circuit 12 through the diode $D_1$ of the OR circuit 11 of the power supply controller 10. When the signal $S_1$ is inputted, the differential circuit 12 outputs a trigger signal $S_T$ of a differential waveform determined by a time constant CR to turn on the transistor 13. Therefore, only when the differential waveform exceeds the ON-level of the transistor 13, is a voltage applied to the timer 14 from the battery 9. Since the level signal $S_1$ is being inputted, the timer 14 is turned on to change the output thereof into a higher potential H for a fixed period of time. Also, since the level signal $S_1$ is being inputted to the other input terminal of the AND circuit 15, both the input terminals of the AND circuit 15 become high, thus keeping the transistor 13 turned on even upon termination of the trigger signal $S_T$.

When the transistor 13 is turned on, since a voltage is also applied to the amplifiers 2 and 7, the level signal $S_1$ is amplified by the amplifier 2 to obtain the UP signal. This signal actuates the compression solenoid valve 4 to inject a gas into a shock absorber 5, thereby increasing the level of the vehicle.

When the level is restored to a predetermined value, the level signal $S_1$ is no longer outputted from the level sensor 1, no UP signal is outputted from the amplifier 2, and, thus, the compression solenoid valve 4 is closed, maintaining the level of the vehicle. At the same time, when no level signal $S_1$ is outputted, the output of the AND circuit 15 becomes a lower potential L to turn off the transistor 13, thereby stopping the voltage supply to the amplifiers 2 and 7.

In addition, even if the vehicle is left parked with one wheel on a sidewalk or parked on uneven ground, or if the level signal $S_1$ is generated from the level sensor 1 for some reason or another, since the timer output automatically changes to a lower potential L after a fixed period of time, the output of the AND circuit 15 also changes to a low potential L to turn off the transistor 13.

Further, if level regulation is completed while the timer is still turned on, since the output of the AND circuit 15 changes to a low potential L to turn off the transistor 13, unnecessary current consumption is prevented. In addition, if the output of the timer 14 is kept at a high potential H due to malfunction of the timer, since the output of the AND circuit 15 becomes a low level L the moment no level signal $S_1$ is outputted, it is possible again to protect the battery.

On the other hand, when the level of the vehicle becomes higher because passengers or freight are unloaded therefrom, the level sensor 6 detects the level and turns on to output the level signal $S_2$. Although the signal $S_2$ is inputted to the timer 14 through a diode $D_2$, since the basic operation after that is identical to that described hereinabove of the level signal $S_1$, the description is omitted here to avoid repetition.

With reference to FIG. 3, a second embodiment of the present invention will be described hereinbelow. A point different from the first embodiment shown in FIG. 2 is that the AND circuit 15 of the power supply controller 10 in FIG. 2 is omitted and the output of the timer 14 directly controls the base of the transistor 13. In this embodiment, when either of the level signals $S_1$ or $S_2$ is outputted, since the differential circuit 12 outputs a trigger signal $S_T$ of a differential waveform determined by a time constant CR to turn on the transistor 13, the timer 14 is turned on for a predetermined period to keep the transistor 13 turned on. Therefore, only while the transistor 13 is kept turned on, a voltage is applied to the amplifiers 2 and 7 for a fixed period after either of level signals $S_1$ or $S_2$ has been outputted. As described above, since a voltage is applied to the amplifiers 2 and 7 only when the level regulation is necessary, it is possible to prevent the supply voltage from being applied to the level regulator unnecessarily, thus protecting the battery from being discharged excessively. Further, in this second embodiment, since the circuit is relatively simple compared with the first one, it is possible to reduce the cost of the circuit.

As described above, according to the present invention, since the power supply is separately applied to the level sensors and the level regulating means, and since the voltage is applied to the level regulating means the moment a level signal is outputted to the power supply controller from the level sensors, and is automatically turned off after a fixed period has elapsed or after no level signal has been outputted within the fixed period, it is possible to produce an economical automatic level regulation whenever the vehicle level varies, regardless of the on/off position of the ignition switch. Such economy is achieved by reducing the dark current or wasteful current flowing through the level regulator even when the vehicle is left parked with one of the wheels on the sidewalk or on uneven ground or when the level signal is kept outputted for some other reason. As a result, it is possible to prevent the level regulating means from including a wasteful current, thus preventing excessive discharge of the battery.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A level regulator for an automotive vehicle which comprises:
   (a) a pair of level-up and level-down sensors for detecting an abnormal level of the vehicle and for outputting a level-up signal $S_1$ and a level-down signal $S_2$ when an abnormal level condition is detected;
   (b) a pair of level-up and level-down amplifiers connected to said pair of level-up and level-down sensors, respectively, for amplifying the level-up and level-down signals to generate an UP signal and a DN signal;
   (c) a compression and exhaust solenoid valve connected to said level-up amplifier and said level-down amplifier, respectively, said compression solenoid valve being energized in response to the UP signal from said level-up amplifier and said exhaust solenoid valve being energized in response to the DN signal from said level-down amplifier;
   (d) a shock absorber connected to said compression and exhaust solenoid valves for lifting the vehicle when said compression solenoid valve is energized to inject a gas thereinto and for lowering the vehicle when said exhaust solenoid valve is energized to exhaust the gas therefrom;
   (e) a power supply for providing voltage to said level-up and level-down sensors and to said level-up and level-down amplifiers; and
   (f) means for controlling said power supply voltage for terminating said supply voltage to said level amplifiers after a predetermined period of time in response to either of the level-up signal $S_1$ or the level-down signal $S_2$ outputted from said level sensors,
   whereby the level regulator is kept activated for a predetermined period of time after either of said level sensors has generated a level signal.

2. A level regulator for an automotive vehicle as set forth in claim 1, wherein said means for controlling said power supply comprises:
   (a) a differential circuit having a series-connected condenser and resistor, an end terminal of which is connected to each of said level sensors for generating a differentiated level-up or level-down signal $S_T$;
   (b) a timer having an input and output terminal, the input terminal connected to each of said level sensors in parallel with said differential circuit; and
   (c) a switching means having a first, a second and a switching terminal, said first terminal connected to said power supply, said second terminal connected to said level amplifiers for supplying a voltage thereto and said switching terminal connected to the output terminal of said timer and to the other end terminal of said differential circuit, said switching means being triggered in response to either the differentiated level-up or level-down signal for supplying voltage to said level amplifiers and being maintained switched to supply said voltage to said level amplifier only while said timer is operative.

3. A level regulator for an automotive vehicle as set forth in claim 2, which further comprises an AND gate, one input terminal of which is connected to the output terminal of said timer, the other input terminal of which is connected to said level sensors, and the output terminal of which is connected to the switching terminal of said switching means, for ANDing the time output signal and the level signals to keep said switching means switched for supplying said voltage only while both the signals are present.

4. A level regulator for an automotive vehicle as set forth in claim 2, wherein said switching means is a transistor.

* * * * *